United States Patent
Schrag

(10) Patent No.: US 8,633,939 B2
(45) Date of Patent: Jan. 21, 2014

(54) SYSTEM AND METHOD FOR PAINTING 3D MODELS WITH 2D PAINTING TOOLS

(75) Inventor: John Schrag, Toronto (CA)

(73) Assignee: Autodesk, Inc., San Rafael, CA (US)

( * ) Notice: Subject to any disclaimer, the term of this patent is extended or adjusted under 35 U.S.C. 154(b) by 1024 days.

(21) Appl. No.: 12/322,780

(22) Filed: Feb. 5, 2009

(65) Prior Publication Data

US 2010/0194768 A1   Aug. 5, 2010

(51) Int. Cl.
*G09G 5/00* (2006.01)

(52) U.S. Cl.
USPC .......................................................... 345/582

(58) Field of Classification Search
USPC ................................................. 345/582–588
See application file for complete search history.

(56) References Cited

U.S. PATENT DOCUMENTS

| | | | |
|---|---|---|---|
| 5,682,505 A * | 10/1997 | Usami et al. | 345/418 |
| 7,274,365 B1 * | 9/2007 | Dunn | 345/426 |
| 2005/0017982 A1 * | 1/2005 | Kane, Jr. | 345/582 |
| 2006/0022991 A1 * | 2/2006 | Scheepers et al. | 345/582 |
| 2006/0125799 A1 * | 6/2006 | Hillis et al. | 345/173 |
| 2008/0052242 A1 * | 2/2008 | Merritt et al. | 705/59 |
| 2009/0021522 A1 * | 1/2009 | Burley et al. | 345/582 |
| 2009/0123045 A1 * | 5/2009 | Quadling et al. | 382/128 |

* cited by examiner

*Primary Examiner* — Aaron M Richer

(74) *Attorney, Agent, or Firm* — Patterson & Sheridan, L.L.P.

(57) ABSTRACT

An 2D layer containing texture coordinate information is inserted into a layered image snapshot of a 3D scene perspective. The layered image snapshot can be painted using 2D painting techniques and then imported back into the 3D scene by using the texture coordinate information to map modified pixels back into the 3D scene.

20 Claims, 7 Drawing Sheets

(3 of 7 Drawing Sheet(s) Filed in Color)

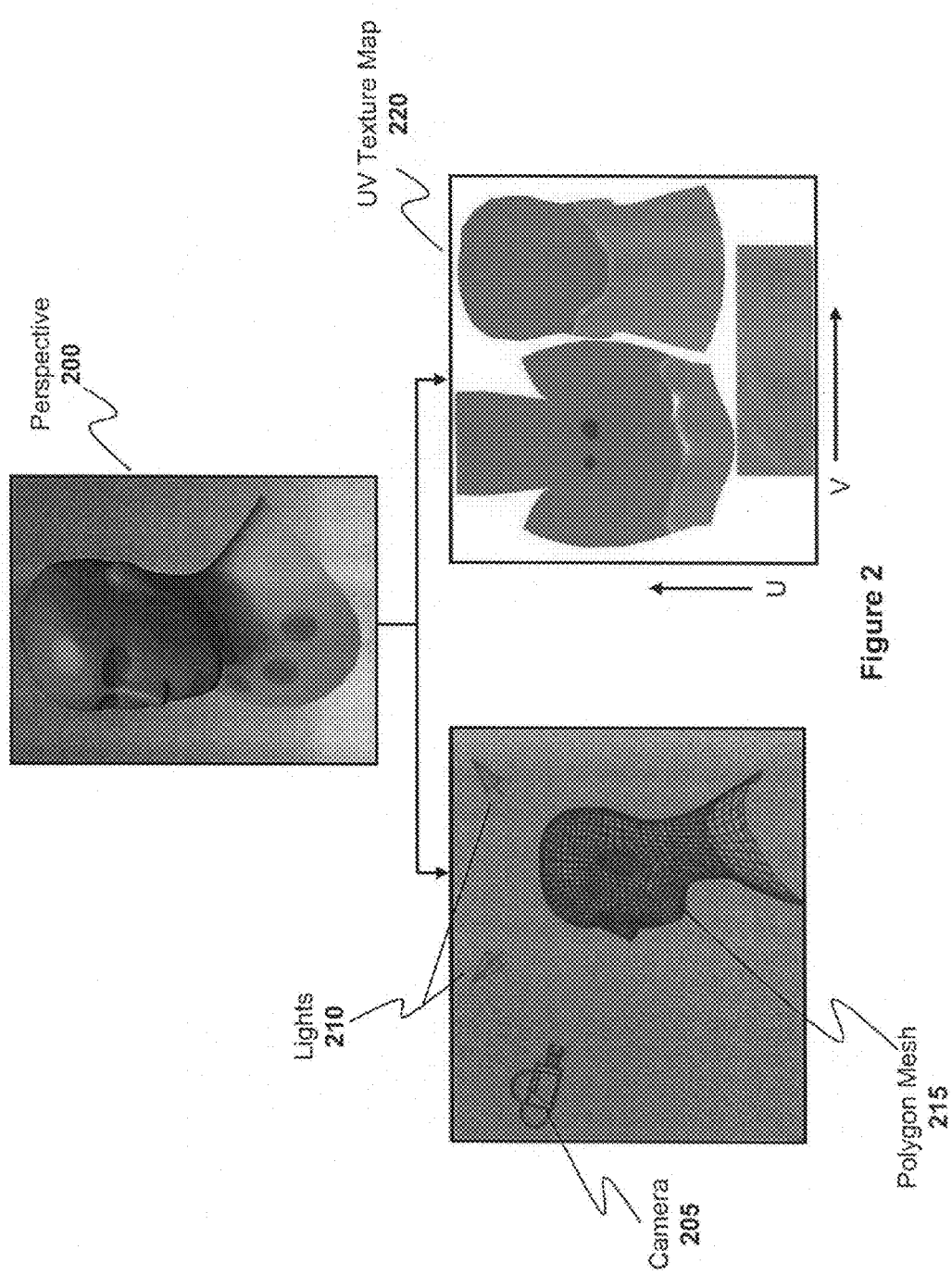

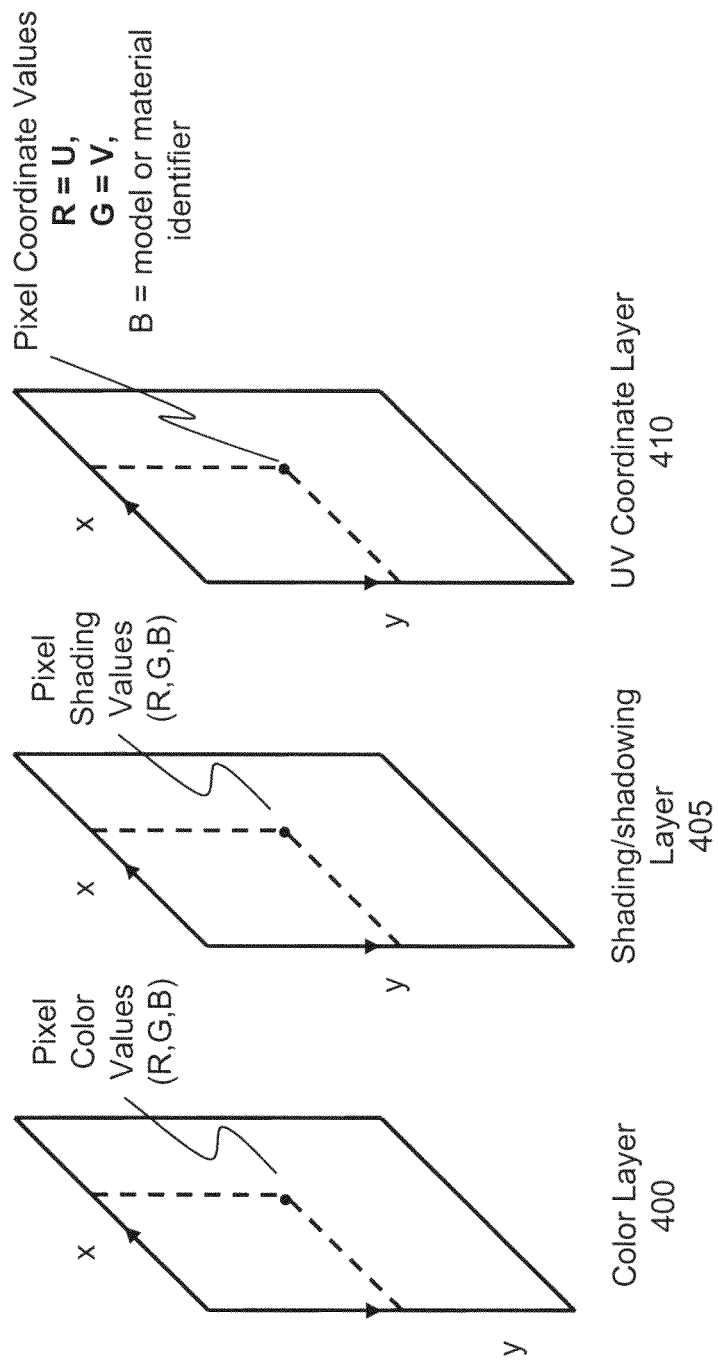

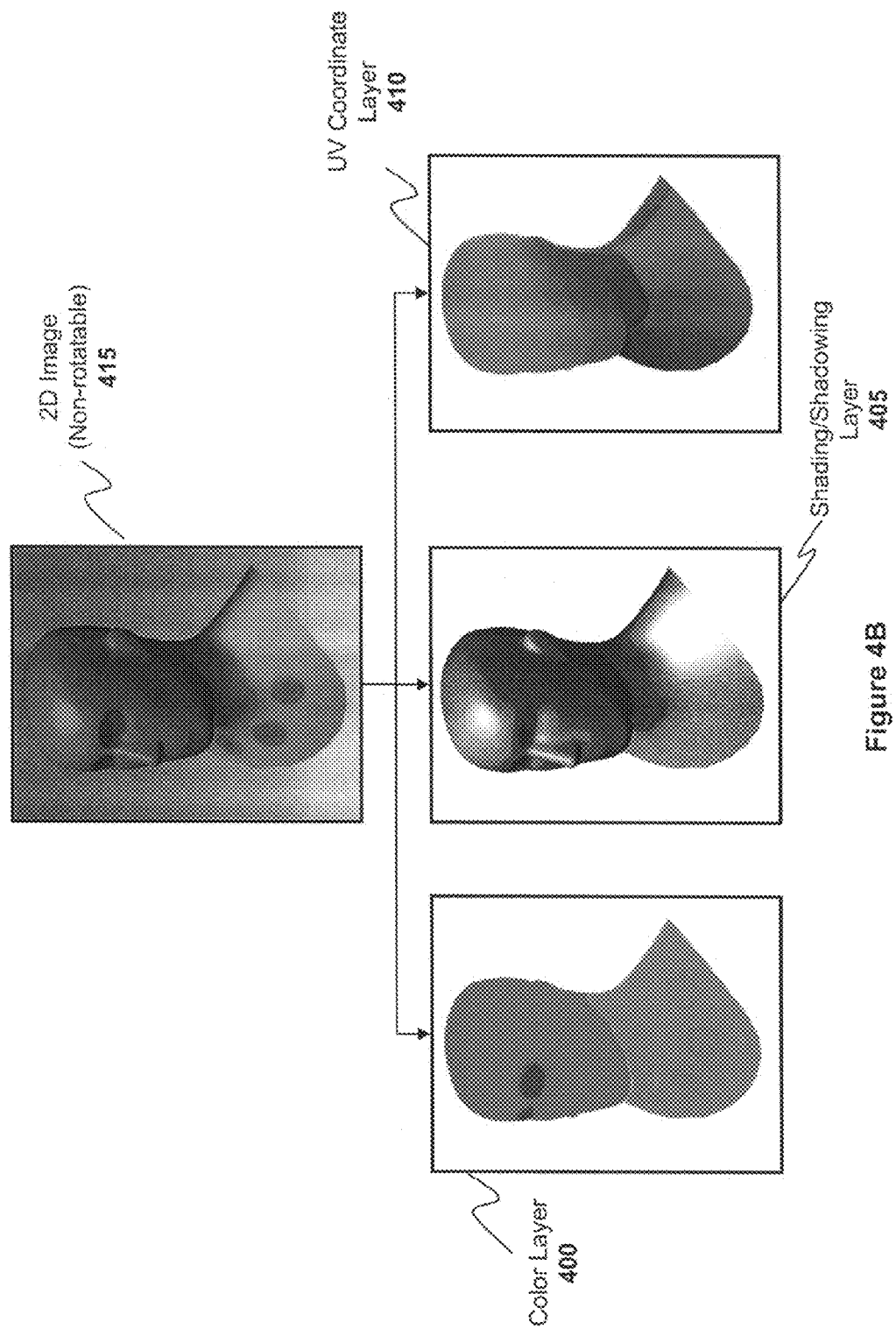

SYSTEM AND METHOD FOR PAINTING 3D MODELS WITH 2D PAINTING TOOLS

BACKGROUND OF THE INVENTION

1. Field of the Invention

The present invention generally relates to 3D graphics rendering software and, more specifically, to using 2D paint software tools to paint 3D scenes.

2. Description of the Related Art

Current 3D rendering applications provide the ability to paint a 3D scene using 2D painting tools. Specifically, 3D rendering applications provide the capability to generate a 2D image of a 3D scene from any particular perspective. The 2D image can then be imported into a 2D painting application to perform the painting. Once the painting is completed, the modified 2D image needs to be imported back into the 3D scene. This is achieved by projecting the modified 2D image back into the 3D scene from the same perspective at which the 2D image was first captured.

While such techniques enable users to utilize sophisticated 2D painting applications, they also constrain the state of the 3D rendering application during the use of the 2D painting application. For example, once the 2D image of the 3D perspective has been generated, the 3D perspective cannot be modified in any way. Any movement of objects in the 3D perspective or change of camera position, field-of-view, or even resizing of the software window, would result in improper alignment of the modified 2D image upon re-projection. Furthermore, since the 3D rendering application must stay locked in the captured perspective, only one generated 2D image can be created and painted using 2D painting applications at any particular moment of time. Additionally, depending upon the implementation of the 3D perspective capturing technology, the resolution of the resulting 2D image may be limited to the resolution of the monitor. Finally, any new painting must be applied twice, once in the 2D painting application, and again when it is projected back into the 3D model.

SUMMARY OF THE INVENTION

One or more embodiments of the present invention provide the capability to paint a 3D scene using 2D painting applications while simultaneously allowing the 3D scene to be modified, reoriented, or repositioned and multiple snapshots to be taken during the 2D painting process. This is achieved by preserving texture coordinate information in a generated 2D image of a perspective of a 3D scene by embedding a special hidden and locked layer containing such coordinate information, such as UV coordinates, into the 2D image. When the 2D image needs to be imported back into the 3D scene, this special layer is referenced to update the relevant pixel values of the texture maps in the 3D scene.

A method for painting a 3D scene according to one embodiment of the present invention includes the steps of capturing a 2D snapshot of a perspective of the 3D scene and inserting a coordinate layer into the 2D snapshot wherein the coordinate layer comprises texture coordinate information. Such texture coordinate information, for example, may be UV coordinate values (as further described in the Detailed Description) that are embedded in the R and G (i.e., red and green) components of the pixel values of the coordinate layer. Inserting the UV coordinate values in an additional layer of the 2D snapshot stores such information in a format (i.e., a 2D image "layer") that is compatible with existing 2D painting applications. The method further includes the steps of importing a modification of the 2D snapshot, wherein the modification is generated by 2D painting techniques (e.g., made available through such existing 2D painting applications), and modifying at least one texture map of the 3D scene in accordance with said modification.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2 illustrates a representation of the components of a 3D scene.

FIG. 4A depicts one embodiment of layers in a 2D layered image file generated from the steps of FIG. 3.

FIG. 4B is a pictorial representation of one embodiment of layers of a 2D layered image generated from the steps of FIG. 3.

DETAILED DESCRIPTION

Figure 1A:
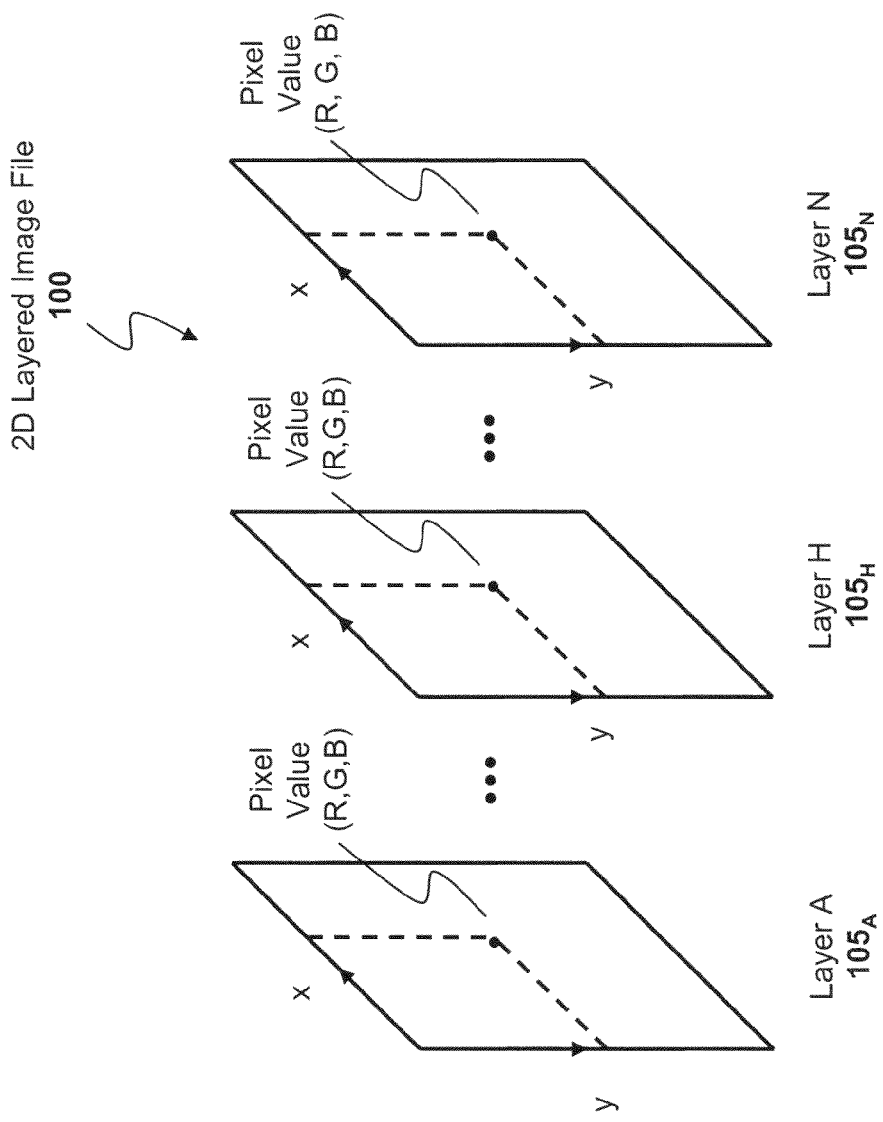
FIG. 1A depicts a structure of a 2D layered image file.
Figure 1B:
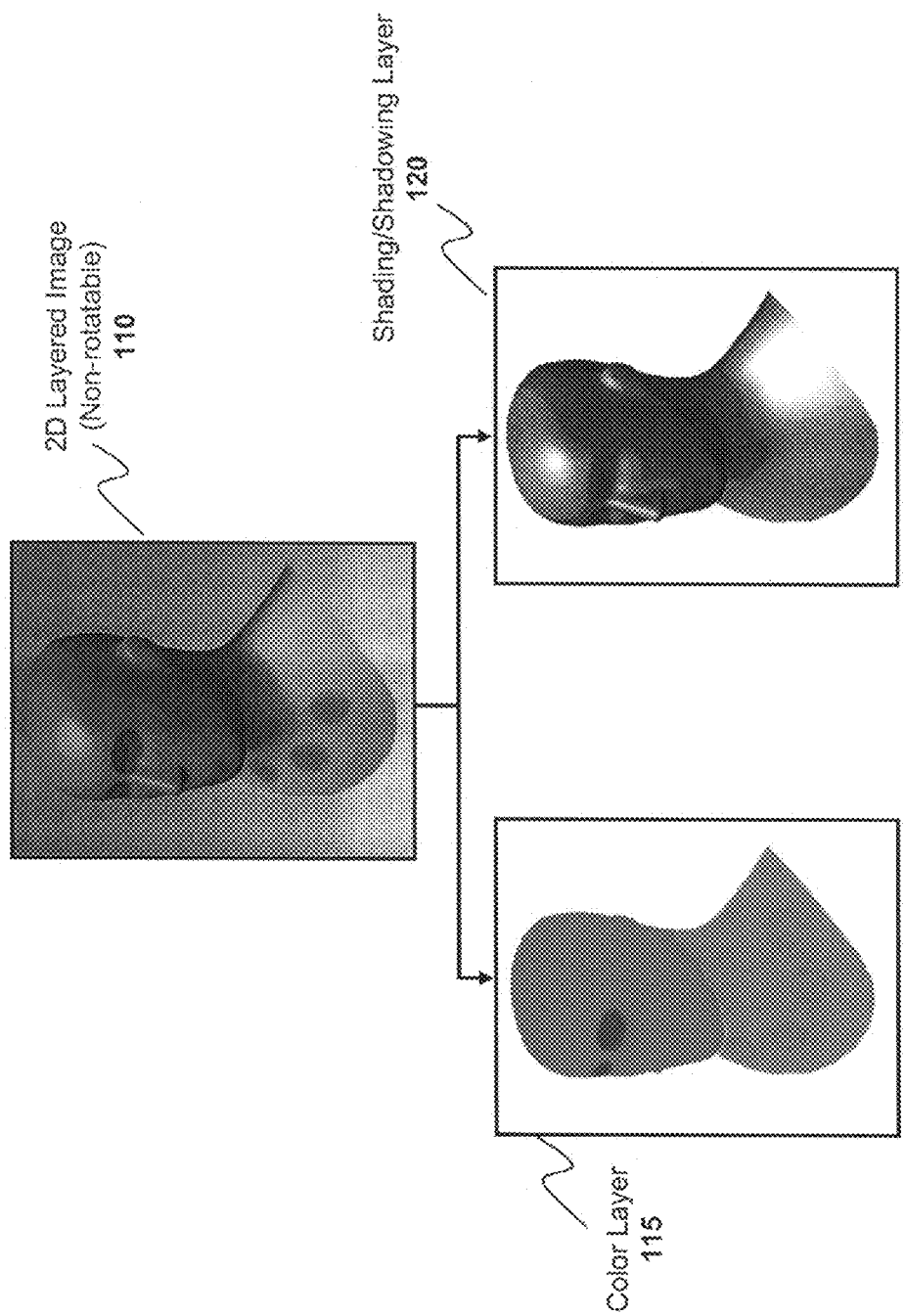
FIG. 1B illustrates a representation of a 2D layered image with 2 layers containing surface appearance attributes.

FIG. 1A depicts a structure of a 2D layered image file 100. Image file 100 comprises a plurality of layers $105_A \ldots 105_N$ which, when superimposed upon each other, comprise a final image. Each layer is a bitmap or array of pixels with each pixel corresponding to a rendered coordinate in the final image. Each pixel is an RGBA (red, green, blue, alpha) data value which, for example, may be represented by 32 bits, with each of the red, green, blue and alpha components comprising 8 bits, resulting in a possible 16.7 million color possibilities for the pixel, with the alpha value indicating how transparent that pixel should be. For example, FIG. 1B depicts an image 110 with 2 layers. One layer 115 contains color information in each pixel value while the other layer 120 contains shading and shadowing information in each pixel value. It should be recognized that the foregoing is merely illustrative of the basic structure of layered image files and that known layered image file formats such as TIFF or PSD and other proprietary formats may include additional headers, tags and other metadata information.

In contrast, a 3D scene file comprises a collection of 3D polygon models with each such model having a polygon mesh and a set of texture maps. A texture map is a single-layered image file that contains information about a surface appearance attribute of the model, such as its color, reflectivity, glossiness, specularity, or even invisible properties such as its hardness. A polygon mesh is a collection of vertices, edges and faces that make up the polygons which define the shape of a 3D model. Each vertex of a polygon maintains five attributes that describe location information, which include its XYZ position in Cartesian coordinate space and a "UV coordinate" on the surface of the model. When moving, editing, or rotating a model, the XYZ locations of the vertices will be modified to reflect their new positions, but the UV coordinates remain constant since they are defined relative to the surface of the 3D model (as further discussed below).

The 3D scene file also further comprises one or more light and camera components. A camera component of a 3D scene file contains a description of a location, direction and field-of-view. It is the camera component of a 3D scene file that is accessed and modified to change the perspective of a 3D scene in a display. Similarly, a light component of a 3D scene file contains a description of how a particular light source illuminates the objects in the scene (e.g., color of light, direction of light, brightness of light, light decay characteristics, etc.). When rendering a 3D scene file, 3D rendering software utilizes information from the camera components (which describe the location and direction from which the models are viewed), the texture maps (which describe how the surface of the model should appear) and the light components (which determine how the surface should be shaded and shadowed) to create an image. The models of the scene can then be shown from any perspective by moving the camera in the scene.

FIG. 2 illustrates a representation of the components of a 3D scene comprising a single polygon model, namely a bust. Perspective 200 depicts the 3D scene from a particular camera point of view, with all the textures (e.g., color, etc.) of the surface of the bust model in place, shaded by the lights in the scene. The camera component of the 3D scene file is represented by camera 205 and the light components of the 3D scene file are represented by lights 210. The polygon mesh of the bust model is represented by 215. UV texture map 220 is a representation of the color of the surface of the bust polygon model that has been "unwrapped" into a 2D representation. In the embodiment of FIG. 2, "U" and "V" are the names of the axes along the 2D plane of UV texture map 220. Each UV coordinate references a pixel value (e.g., divided into red, green and blue components) in UV texture map 220 that defines the color for the corresponding point on the surface of the 3D model and each point on the surface of the 3D model has a corresponding UV coordinate in UV texture map 220. When rendering the models in a 3D scene, 3D rendering software determines for each pixel in the rendering, what surface point on which particular model in the scene is being displayed (in FIG. 2, for example, there is only one model, namely the bust). Specifically, it determines the UV coordinate associated with the particular point in the polygon model and references the UV texture map associated with the model to obtain the color of the pixel. It should be recognized that such UV texture maps may include further information relating to other surface appearance attributes, such as glossiness or reflectivity, or separate texture maps may be used to store such additional surface appearance attributes. By unwrapping a polygon mesh of a 3D model such as 215 into a 2D texture map such as 220, artists are more easily able to paint the surface of the 3D model in 2D, thereby assigning pixel values to UV coordinates in the UV texture map that correspond to points on the surface of the 3D model. It should be recognized that a scene file may be comprised of separate files for its camera and light components, polygon meshes and texture maps in alternative embodiments.

Figure 3:
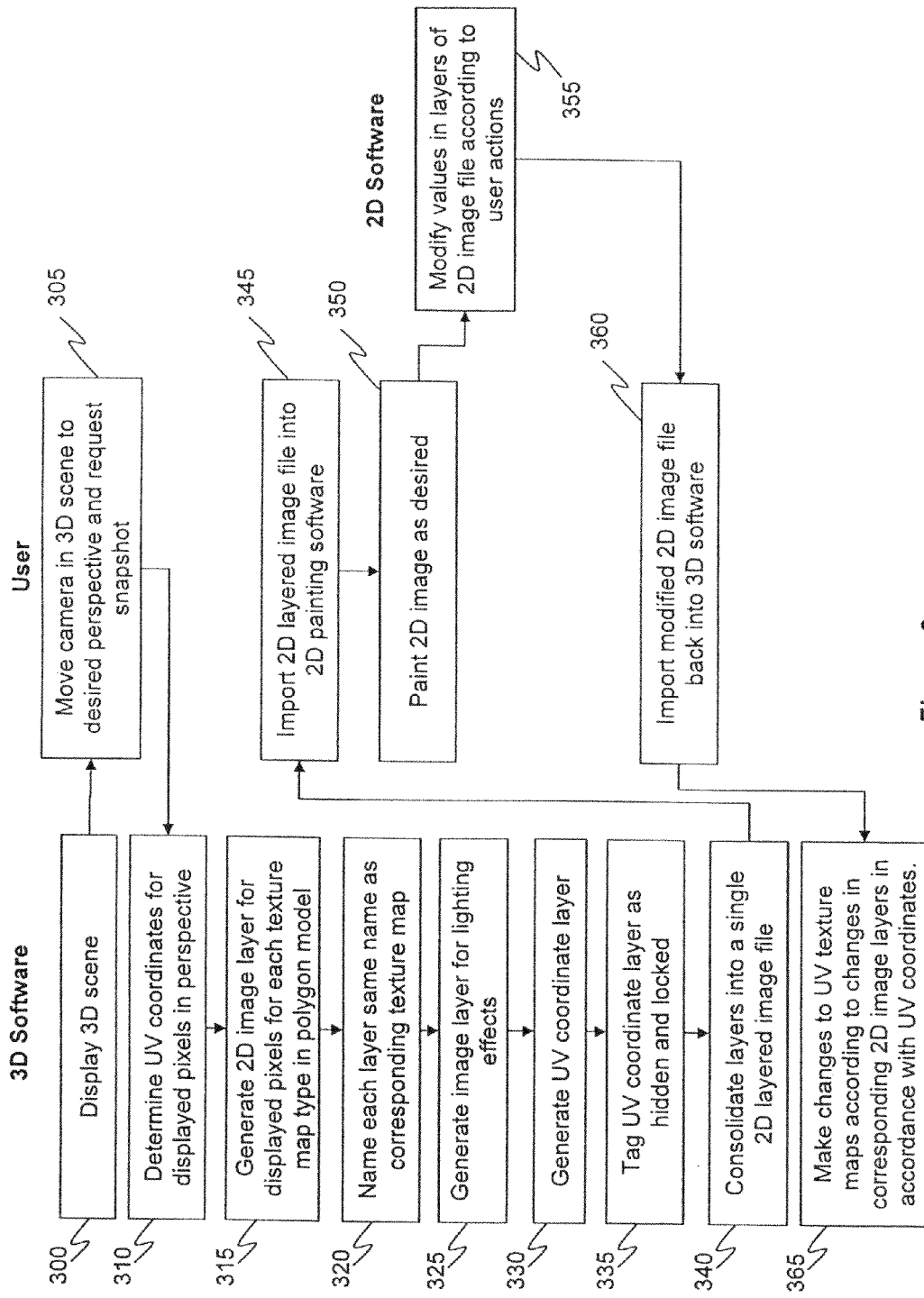
FIG. 3 depicts a flow chart of the steps taken to paint a portion of a 3D scene in accordance with one embodiment of the present invention.

FIG. 3 depicts a flow of steps taken to paint a portion of a 3D scene in accordance with one embodiment of the present invention. In step 300, a 3D scene having at least one 3D polygon model comprising a polygon mesh and at least one UV texture map (e.g., color texture map), is displayed by 3D rendering software. In step 305, the 3D polygon scene is rotated (e.g., by a user) to a desired perspective and a 2D "snapshot" of the perspective is requested. In step 310, the 3D rendering software identifies the points on each of the 3D polygon models in the scene corresponding to pixels that are displayed in the desired perspective, and determines the corresponding UV coordinates in the UV texture maps of the corresponding 3D polygon models for each of these points. In step 315, the 3D rendering software accesses the various UV texture maps (e.g., corresponding to a surface appearance attribute such as color, reflectivity, glossiness, etc.) for each of the 3D polygon models in the scene and generates an image layer that contains the values for each of the surface appearance attributes for the displayed pixels of the perspective. In step 320, each such generated image layer is given a name that corresponds to the UV texture maps for the same surface appearance attribute. In step 325, the 3D rendering software generates an additional image layer comprising shading and shadowing information from the perspective. In step 330, the 3D rendering software generates an additional image layer that comprises the UV coordinates of the displayed pixels of the perspective (hereinafter, the "UV coordinate layer"). In one embodiment, the U coordinate is stored as the red component of the layered image layer's relevant pixel and the V coordinate is stored as the green component. The blue component of the pixel may be utilized to store other meta-data information. In the foregoing discussion of FIG. 3, for example, a model identifier may be stored in the blue component of the pixel to identify which model's texture maps pertain to the UV coordinates stored in the red and green components. In alternate embodiments, the blue component of the pixel may be used to store a face identifier if different UV texture maps are being utilized for different faces of the model. It should be recognized, however, that the UV coordinate may be stored in any combination of the color components of the relevant pixel. In step 335, the UV coordinate layer is tagged as hidden and locked and in step 340, the 3D rendering software consolidates the generated layers into a single layered image file. It should be further recognized that other generated image layers relating to surface appearance attributes such as glossiness and reflectivity may also be set as hidden by the 3D rendering software (such that the artist may make them visible during subsequent painting as desired).

In step 345, the user imports the generated layered image file into a 2D painting application. In step 350, the user utilizes the tools of the 2D painting application to paint the layered image as desired (e.g., change colors or other surface appearance attributes). In modifying the layered image as desired, pixel values in the various surface appearance attribute layers (e.g., color, reflectivity, glossiness, etc.) of the file may be modified accordingly by the 2D painting software application (but not the UV coordinate layer or the shading/shadowing layer) in step 355. Upon completion of the modifications, the user imports the modified layered image file back into the 3D rendering software in step 360. In step 365, the 3D rendering software examines each pixel in each layer of the layered image file and, by referencing the UV coordinate (and model identifier, if needed) in the UV coordinate layer of the layered image, is able to appropriately update the values in each of the UV texture maps corresponding to such layer (e.g., UV coordinates in color UV texture map of the appropriate 3D model is updated according to color layer, etc.). It should be recognized that if additional coordinates are needed in certain implementations, additional layers may be added to the layered image file. Additionally, to the extent that a 3D polygon model does not yet have an associated UV texture map, alternative embodiments may assign arbitrary UV coordinates to each vertex and/or point on the surface of the polygon mesh.

FIG. 4A illustrates one embodiment of layers in a layered image file generated from the steps of FIG. 3. Layer 400 comprises a bitmap of pixels representing the color of the image, with each pixel having a color value with RGB components. Layer 405 comprises a bitmap of pixels representing the shading and shadowing of the image generated from step 325 of FIG. 3, with each pixel having a color value with RGB components. Layer 410 is a UV coordinate layer generated from step 330 of FIG. 3. Layer 410 also comprises a bitmap of pixels, however, the values of each of these pixels represent the U and V coordinate values of the corresponding displayed pixel in the 3D polygon model. As previously discussed, the U coordinate may be embedded in the R component of the pixel value while the V coordinate may be embedded into the G component of the pixel value. While layers 400 and 405 are overlaid upon each other to provide the final layered image, layer 410 remains hidden and locked when displayed by 2D rendering software because it contains texture coordinate information (namely, UV coordinate information) that is only useful when importing the layered image back into the 3D rendering scene. FIG. 4B is a pictorial representation of one embodiment of the layers of a layered image generated from the steps of FIG. 3. Final image 415 is composed of three layers: color layer 400, shading layer 405, and UV coordinate layer 410. Although UV coordinate layer 410 can be displayed pictorially, the color pallet represented by the pixel values are meaningless because the UV coordinates embedded within the pixel values of the layer (e.g., U value is embedded in the red component and V value is embedded in the green component) are meant to be hidden and locked and accessible by 3D rendering software rather than 2D rendering software. Indeed, as shown, final image 415 does not include the color overlay represented by UV coordinate layer 410.

Figure 5:
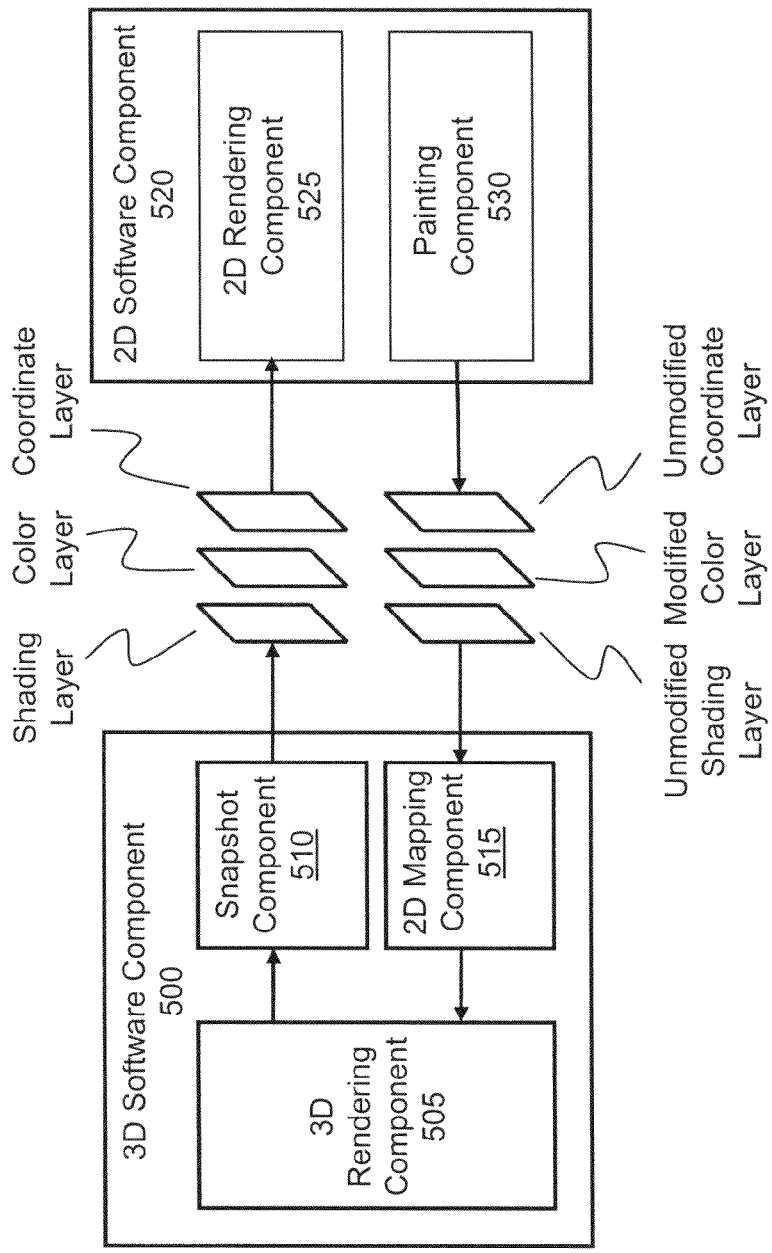
FIG. 5 is a block diagram of software components that may be executed by a processor of a computer system in accordance with an embodiment of the invention

FIG. 5 is a block diagram of software components that may be executed by a processor of a computer system in accordance with an embodiment of the invention. A 3D software component 500 comprises a 3D rendering component 505 to render a 3D model or scene (e.g., a collection of models) on a display and enable the rotation of the model or scene to present various perspectives on the display. 3D software component 500 also includes a snapshotting component 510 that provides the capability to capture a 2D snapshot image (comprised of one or more layers with each layer maintaining a surface appearance attribute) of a perspective of a 3D model or scene rendered through rendering component 505 and insert an additional layer containing the UV coordinates into the 2D snapshot image in accordance with the steps of FIG. 3. Additionally, a 2D mapping component 515 provides the capability to receive a layered image originating from snapshotting component 510 and map the surface appearance attribute values from the various layers of the layered image into corresponding UV texture maps in the 3D model or scene by referencing the UV coordinate layer of the layered image.

A 2D software component 520 includes a 2D rendering component 525 that can receive a layered image file, such as one generated by snapshotting component 505, and display the layered image. A user can change various surface appearance attributes such as the color of the displayed layered image by interacting with a painting component 530 of the 2D software component. Such a painting component 530 will modify pixel values in the various layers of the layered image file in accordance with the actions taken by the user (e.g., through a painting graphical user interface presented by painting component 530). The software components presented in FIG. 5 may be separate or standalone software applications running on a single computer, components of a single software application, or may be executed on a distributed system of computers communicating over a data network, such as a local area network (LAN), wide area network (WAN), or the Internet.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. For example, the foregoing discussions describe embodiments in which image layers are comprised of pixel values with three color components, RGB. In such embodiments, each pixel value of a UV coordinate layer in the layered image provides storage capacity for the U and V values (i.e., in the R component and G component, for example) in addition to one meta-data property value, such as a model identifier (i.e., in the B component, for example). However, alternative embodiments may use and/or generate layered image formats that contain an additional alpha channel, resulting in an extra storage location per pixel. Because such layered image formats utilize different pixel representations, they may be able to accommodate more meta-data values. Similarly, while the foregoing discussions describe embodiments in which the blue color channel in the UV coordinate layer may hold a model identifier or face identifier, alternate embodiments may store any other meta-data information as may be needed by the 3D modeling software, such as a "material" or "shader" identifier as further discussed below. Furthermore, such meta-data also need not correspond to an attribute of the pixel at the UV location. For example, before creating the snapshot of the 3D model, the user may orientate the 3D model or scene to a desired position. Parameters describing the position of the model, such as zoom level, camera angle, etc., may be stored in the available color values, such that the model can be repositioned by the 3D modeling software as part of the mapping process. Similarly, although the foregoing description described embodiments having a single UV coordinate layer to maintain meta-data such as UV coordinates, any arbitrary amount or type of meta-data can be maintained with the 2D snapshot images through the addition of extra layers. These additional layers may be locked and hidden with respect to the 2D paint software and are included within the 2D snapshot image file. Such additional meta-data can be defined as an attribute of the pixel at the UV position as defined in the coordinate layer, or any arbitrary meta-data, which may or may not be associated to a particular pixel at the UV location. It should be further recognized that the techniques disclosed herein may be utilized with 3D models that describe surfaces through means other then polygon meshes, such as, for example, sets of NURB patches, subdivision surfaces, implicit geometry and the like. Similarly, it should be recognized that the techniques herein may also be utilized in situations where 3D models share texture maps (e.g., through the use of "shader" or "material" data objects, etc.) rather than having their own texture maps. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

I claim:

1. A method for painting a three-dimensional (3D) scene, the method comprising:
   capturing a two-dimensional (2D) snapshot of a perspective of the 3D scene, wherein the capturing comprises:
      accessing UV coordinates of displayed pixels of said 2D snapshot, and
      generating at least one surface appearance attribute layer for said 2D snapshot, wherein values in said surface appearance attribute layer correspond to values of said UV coordinates in a texture map of said 3D scene;
   inserting a coordinate layer into the 2D snapshot wherein said coordinate layer comprises texture coordinate information;
   importing a modification of said 2D snapshot, wherein said modification is generated by 2D painting techniques; and
   modifying at least one texture map of said 3D scene in accordance with said modification, wherein the modifying comprises:
      identifying pixel value changes made in said at least one surface appearance attribute layer.

2. The method of claim 1, wherein said 2D snapshot comprises a plurality of layers, wherein each of said layers comprises surface appearance attribute information for each pixel in said 2D snapshot.

3. The method of claim 2, wherein said surface appearance attribute information for each of said layers is selected from the group consisting of color, reflectivity, specularity, and glossiness.

4. The method of claim 2, wherein said modification comprises changes to values in said plurality of layers.

5. The method of claim 1, wherein, for each of said texture coordinates, a U coordinate is stored in a first color component of a pixel value of said coordinate layer and a V coordinate is stored in a second color component of said pixel value of said coordinate layer.

6. The method of claim 5, wherein a model identifier corresponding to the 3D model in said 3D scene where the pixel resides is stored in a third color component of said pixel value of said coordinate layer.

7. The method of claim 1, wherein said capturing step further comprises naming said surface appearance attribute layer the same name as said texture map.

8. The method of claim 1, further comprising the step of tagging said coordinate layer as locked and hidden.

9. The method of claim 1, wherein said modification is performed via a separate 2D painting software application.

10. The method of claim 1, wherein said modifying step further comprises extracting UV coordinates from said coordinate layer corresponding to said identified pixel value changes.

11. The method of claim 10, wherein said modifying step further comprises inserting said pixel value changes into said at least one texture map at said corresponding UV coordinates.

12. A method for painting a three-dimensional (3D) scene, the method comprising:
   capturing a two-dimensional (2D) snapshot of a perspective of the 3D scene, wherein the capturing comprises:
      accessing UV coordinates of displayed pixels of said 2D snapshot;
      generating at least one surface appearance attribute layer for said 2D snapshot, wherein values in said surface appearance attribute layer correspond to values of said UV coordinates in a texture map of said 3D scene; and
      naming said surface appearance attribute layer the same name as said texture map;
   inserting a coordinate layer into the 2D snapshot wherein said coordinate layer comprises texture coordinate information;
   importing a modification of said 2D snapshot, wherein said modification is generated by 2D painting techniques; and
   modifying at least one texture map of said 3D scene in accordance with said modification, wherein the modifying comprises:
      identifying pixel value changes made in said at least one surface appearance attribute layer;
      extracting UV coordinates from said coordinate layer corresponding to said identified pixel value changes;
      identifying said at least one texture map by matching a name of at least one surface appearance attribute layer with the name of said at least one texture map; and
      inserting said pixel value changes into said at least one texture map at said corresponding UV coordinates.

13. A computer system configured to render a three-dimensional (3D) scene, the computer system comprising a processor programmed to perform the steps of:
   capturing a two-dimensional (2D) snapshot of a perspective of the 3D scene, wherein the capturing comprises:

accessing UV coordinates of displayed pixels of said 2D snapshot, and generating at least one surface appearance attribute layer for said 2D snapshot, wherein values in said surface appearance attribute layer correspond to values of said UV coordinates in a texture map of said 3D scene;

inserting a coordinate layer into the 2D snapshot wherein said coordinate layer comprises texture coordinate information;

importing a modification of said 2D snapshot, wherein said modification is generated by 2D painting techniques; and modifying at least one texture map of said 3D scene in accordance with said modification, wherein the modifying comprises:

identifying pixel value changes made in said at least one surface appearance attribute layer.

14. The computer system of claim 13, wherein said modification is performed via a separate 2D painting software application.

15. The computer system of claim 13, wherein said capturing step further comprises naming said surface appearance attribute layer the same name as said texture map.

16. The computer system of claim 13, wherein said 2D snapshot comprises a plurality of layers, wherein each of said layers comprises surface appearance attribute information for each pixel in said 2D snapshot.

17. A computer system configured to render a three-dimensional (3D) scene, the computer system comprising a processor programmed to perform the steps of:

capturing a two-dimensional (2D) snapshot of a perspective of the 3D scene, wherein the capturing comprises:
accessing UV coordinates of displayed pixels of said 2D snapshot;
generating at least one surface appearance attribute layer for said 2D snapshot, wherein values in said surface appearance attribute layer correspond to values of said UV coordinates in a texture map of said 3D scene; and
naming said surface appearance attribute layer the same name as said texture map;

inserting a coordinate layer into the 2D snapshot wherein said coordinate layer comprises texture coordinate information;

importing a modification of said 2D snapshot, wherein said modification is generated by 2D painting techniques; and modifying at least one texture map of said 3D scene in accordance with said modification, wherein the modifying comprises:
identifying pixel value changes made in said at least one surface appearance attribute layer;
extracting UV coordinates from said coordinate layer corresponding to said identified pixel value changes;
identifying said at least one texture map by matching a name of at least one surface appearance attribute layer with the name of said at least one texture map; and
inserting said pixel value changes into said at least one texture map at said corresponding UV coordinates.

18. A non-transitory computer readable storage medium having stored therein a computer program for rendering a three-dimensional (3D) scene, wherein a computer system executing the computer program carries out the steps of:

capturing a two-dimensional (2D) snapshot of a perspective of the 3D scene, wherein the capturing comprises:
accessing UV coordinates of displayed pixels of said 2D snapshot, and
generating at least one surface appearance attribute layer for said 2D snapshot, wherein values in said surface appearance attribute layer correspond to values of said UV coordinates in a texture map of said 3D scene;

inserting a coordinate layer into the 2D snapshot wherein said coordinate layer comprises texture coordinate information;

importing a modification of said 2D snapshot, wherein said modification is generated by 2D painting techniques; and modifying at least one texture map of said 3D scene in accordance with said modification, wherein the modifying comprises:
identifying pixel value changes made in said at least one surface appearance attribute layer.

19. The non-transitory computer readable storage medium of claim 18, wherein said capturing step further comprises naming said surface appearance attribute layer the same name as said texture map.

20. A non-transitory computer readable storage medium having stored therein a computer program for rendering a three-dimensional (3D) scene, wherein a computer system executing the computer program carries out the steps of:

capturing a two-dimensional (2D) snapshot of a perspective of the 3D scene, wherein the capturing comprises:
accessing UV coordinates of displayed pixels of said 2D snapshot;
generating at least one surface appearance attribute layer for said 2D snapshot, wherein values in said surface appearance attribute layer correspond to values of said UV coordinates in a texture map of said 3D scene; and
naming said surface appearance attribute layer the same name as said texture map;

inserting a coordinate layer into the 2D snapshot wherein said coordinate layer comprises texture coordinate information;

importing a modification of said 2D snapshot, wherein said modification is generated by 2D painting techniques; and modifying at least one texture map of said 3D scene in accordance with said modification, wherein the modifying comprises:
identifying pixel value changes made in said at least one surface appearance attribute layer;
extracting UV coordinates from said coordinate layer corresponding to said identified pixel value changes;
identifying said at least one texture map by matching a name of at least one surface appearance attribute layer with the name of said at least one texture map; and
inserting said pixel value changes into said at least one texture map at said corresponding UV coordinates.

* * * * *